Feb. 10, 1953  I. A. GREENWOOD, JR  2,628,024
SQUARING DEVICE
Filed April 22, 1950
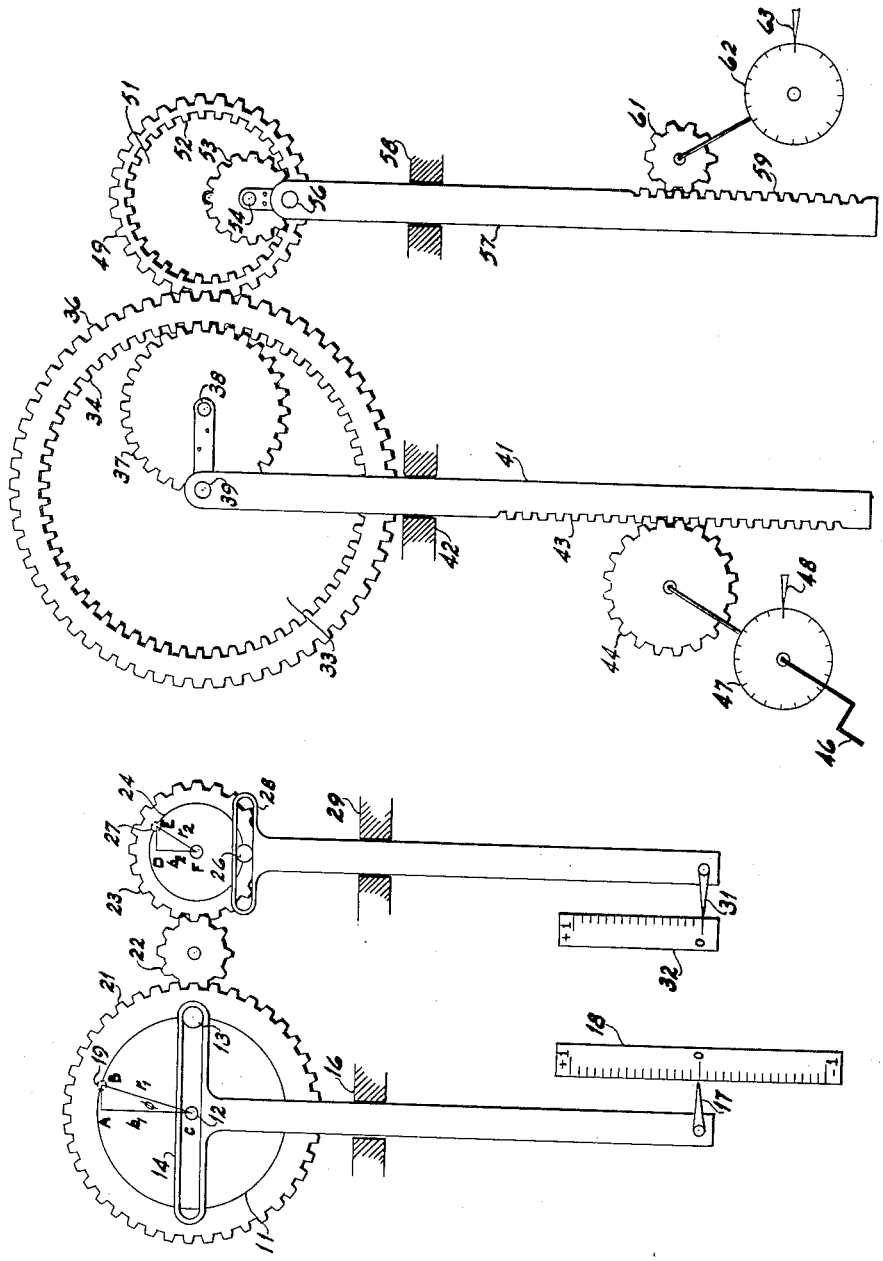
Inventor
IVAN A. GREENWOOD Jr.
By
H.A. Mackie
Attorney Patented Feb. 10, 1953

2,628,024

UNITED STATES PATENT OFFICE 2,628,024

SQUARING DEVICE

Ivan A. Greenwood, Jr., Pleasantville, N. Y., assignor, by mesne assignments, to Librascope, Inc., a corporation of California Application April 22, 1950, Serial No. 157,434

8 Claims. (Cl. 235—61)

This invention pertains to computers in which the input and output data are represented by magnitudes of motions of mechanical parts connected together mechanically, and more specifically to devices for determining squares and square roots.

This invention provides means to solve the equation $$Y = x^{2^n} \quad (1)$$

in which $n$ is any positive or negative integer and in which $x$ is the independent variable. One unit of the invention solves this equation with $n$ placed equal to 1, two units are required for solution when $n$ equals 2, and in general $n$ units are required for solution. When $n$ is positive, the means of the invention solves for powers of $x$, and when $n$ is negative, the solution is for roots of $x$. Obviously, the simplest cases, when $n=1$ or $-1$, are those in which such a device will find the most application.

One of the best methods of squaring heretofore known and at present largely used, employs a squaring pin cam. Such a cam is somewhat expensive to make, particularly when it is required to be highly accurate, consisting as it does of scores or hundreds of short pins placed in one face of a disc to form a spiral gear.

On the other hand the present squaring device, which is theoretically exact, is easily and cheaply made with the high accuracy required to approximate its theoretical performance. It is made of a few simple components, and it is completely reversible, so that input data can be applied to either "input" or "output" connection point without any change in design or adjustment, the remaining connection point furnishing the output data.

The apparatus of this invention consists simply of two discs, one driving the other in 2:1 ratio. Each disc is attached to a Scotch yoke or other device for deriving from its rotation the cosine thereof. The resulting displacements of the Scotch yokes are in square relation and may be indicated on properly disposed linearly divided scales.

In operation, an input quantity is applied to displace one of the Scotch yokes and the displacement of the other Scotch yoke is then either the square or the square root of the input quantity, depending upon the relative proportions of the components.

One purpose then of this invention is to provide a mechanism for mechanically and continuously computing the square of a quantity.

Another purpose is to provide a mechanism for mechanically and continuously computing the square root of a quantity.

Still another purpose of this invention is to provide a mechanical computer, consisting of a plurality of units connected in tandem, having a plurality of output displacements which are the second, fourth, eighth, etc. powers or roots of the input displacement.

A further understanding of this invention can be gained from the detailed description together with the drawings, in which:

Fig. 1 is a schematic illustration of a form of the invention employing Scotch yokes and longitudinal scales.

Fig. 2 is a schematic illustration depicting planetary gear mechanisms and rotary dial scales.

Referring now to Fig. 1, a disc 11 is arranged to revolve around its center 12 and carries a pin 13 fixed in one face. A Scotch yoke 14 surrounds the pin 13 and slides longitudinally in the slide bearing 16. The lower end of the Scotch yoke carries a pointer 17 for indication of the yoke displacement upon a scale 18. This scale has a center zero corresponding to the position of the pin 13 when it is 90° displaced from its topmost position, as depicted. As is well known, in such an arrangement the linear displacement of the pointer 17 upon the scale 18 is directly proportional to the cosine of the angular displacement of the disc 11, the zero angle position thereof being with the pin 13 at its topmost position for the scale indications shown.

Let it be considered that the independent variable to be applied to the squaring device is in the form of a mechanical displacement datum, which is applied by any means, as for example, manually, by displacing the Scotch yoke 14 until the pointer 17 indicates upon the scale 18 the magnitude of the displacement datum. It is then obvious that the input displacement is proportional to $\cos \phi$, when $\phi$ is the angle through which the disc 11 is caused to turn by movement of the Scotch yoke, $\phi$ being measured from its zero position at the top of the disc. Calling the independent input variable $x$, then $$x = \cos \phi \quad (2)$$

In the disc 11 the dashed circle 19 represents any position of the pin 13 corresponding to an input datum magnitude. The cosine of the angle $\phi$ subtended at the center by the sides AC and BC of the triangle ABC is then the ratio $$\frac{AC}{BC}$$

BC is the radius of the pin position, here termed $r_1$, and the side AC is termed $b_1$. Then in general $$\cos \phi = \frac{b_1}{r_1} \quad (3)$$

and if $r_1 = 1$, $$\cos \phi = b_1 \quad (4)$$

The edge of the disc 11 is provided with teeth 21 which mesh with the teeth of an idler gear 22. These teeth in turn mesh with teeth 23 forming the periphery of a second disc 24. The disc 24 carries a pin 26 at a radius $r_2$ which is made exactly one-half of $r_1$. The pitch circumference of the disc 24 is made one-half of that of the disc 11, so that the latter in turning through an angle $\phi$ causes the disc 24 to turn through angle $2\phi$. Let the topmost or zero angle position to which the disc 24 has been caused to turn when driven by the disc 11. In attaining this angle the disc has departed from its zero angle position by an amount $2\phi$ and the cosine thereof is the ratio of $b_2$ to $r_2$ or $$\cos 2\phi = \frac{b_2}{r_2} \quad (5)$$

If $r_1 = 1$, $r_2 = \frac{1}{2}$ and $$\tfrac{1}{2} \cos 2\phi = b_2 \quad (6)$$

A Scotch yoke 28 embraces the pin 26, is secured in a slide bearing 29, and carries at its end a pointer 31. Since the cosine has both positive and negative values it might be expected that the scale associated with this pointer should have a center zero and, when the length of $r_1$ is unity, Equation 5 indicates that the ends of the scale should be $+\tfrac{1}{2}$ and $-\tfrac{1}{2}$. However, it is desired to secure a scale having an end zero and a maximum of $+1$. The reference numeral 32 represents such a scale and modification of Equation 6 by adding $\tfrac{1}{2}$ to it correctly represents the readings of this scale as a function of $\phi$. Equation 6 then becomes $$\tfrac{1}{2} + \tfrac{1}{2} \cos 2\phi = b_2 \quad (7)$$

The following trigonometric relation exists:

$$\tfrac{1}{2} + \tfrac{1}{2} \cos 2\phi = \cos^2 \phi \quad (8)$$

Inasmuch as the side $b_2$ represents the magnitude of linear movement of the Scotch yoke 28 which, as indicated on the scale 32, is the value of $y$, the dependent variable, it follows that $$y = b_2 = \cos^2 \phi \quad (9)$$

From Equation 2, $$\cos^2 \phi = x^2$$

Therefore $$y = x^2 \quad (10)$$

That is, the indication of the pointer on the scale 32 is the square of the indication of the pointer on the scale 18.

It is obvious that this device is completely reversible so that an independent variable may be represented by a datum quantity introduced by positioning the Scotch yoke 28 manually or otherwise so that the datum quantity is indicated on the scale 32 by the pointer 31. The output quantity is then indicated by the position of the pointer 17 on the scale 18 and will be the square root of the input quantity.

There is, however, a limitation inherent in the mathematical basis of this device which limits the range of operation of any mechanical or other device using this principle, the manifestation of which is here the inability of the driving yoke to drive the disc when the pin thereof is at dead center, when the input disc angle is zero or 180°, and does not operate satisfactorily in narrow ranges near dead center. Outside of these ranges near dead center, however, the device is not only operative to drive an indicating pointer, but obviously over a great part of the operating range additional power is available to drive other mechanisms.

Equation 7 was derived on the basis of several specified limitations, such as that the turn ratio of the connected gears 21 and 23 shall be 1:2. It is obvious that a result will be secured in the mechanical operation of this device if the turn ratio be other than $\tfrac{1}{2}$, although it will not be a square or square root of the input. Similarly, the phase of one gear with respect to the other can be shifted, the ratio of the radii $r_1$ and $r_2$ can be made other than 2, and the longitudinal shift of the scale 32 may be made other than as specified and required for the described intended purpose. The generalized form of equation including all of these four independent design variations is:

$$y = C + r_2 \cos \left( P + G \left( \cos^{-1} \frac{x}{r_1} \right) \right) \quad (11)$$

in which C is displacement of the $y$ scale, P is gear phase displacement, and G is the gear ratio representing the angular displacement of the smaller gear divided by that of the larger gear. The apparatus of the invention is thus capable of solving the function of Equation 11, operating in either direction as desired to solve for either $x$ or $y$.

Referring now to Fig. 2, a disc 33 is provided with both internal gear teeth 34 and external peripheral gear teeth 36. The internal teeth are meshed with a pinion 37 journalled in the disc 33. The pinion journal 38 is at a radius in the disc that is one-half of the pitch radius of the internal teeth, so that the pitch diameter of the pinion is one-half that of its meshing annular gear. The pinion 37 carries a pin 39 fixed at a radius equal to its pitch radius. This pin carries one end of a bar 41 which is pivoted on it. The bar is restricted to longitudinal motion by a slide bearing 42. This mechanism in operation effectively duplicates the motion of a disc carrying a Scotch yoke. As the bar 41 moves, it rotates the pinion 37 and the disc 33, so that the movement of the pin 39 is vertical at all times, and its magnitude is proportional to the cosine of the angle swept by a point on the disc 33.

The bar 41 is driven through a rack 43 by a pinion 44, which may be actuated in any manner, for example, by hand using a hand crank 46. A dial 47 and associated fixed pointer 48 are furnished to indicate angular positions of the pinion 44 proportional to linear positions of the bar 41 and hence proportional to the cosine of the angular position of the disc 33. The dial 47 carries a scale having a center zero corresponding to the median position of the bar, when its pivot pin 39 is in line with the center of the disc 33 and the journal 38 is aligned horizontally with the pin 39.

The external gear teeth 36 of the disc 33 mesh with external teeth 49 of a second disc 51, this disc having a pitch diameter exactly half that of the external gear pitch diameter of the disc 33. The disc 51 therefore is angularly displaced when driven by the disc 33 by twice that of the disc 33. The disc 51 also has internal teeth 52 and carries a pinion 53 meshing therewith. This pinion 53 is journalled at 54 in the annular gear 51 at a radius therein equalling one-half of the pitch radius of the internal gear teeth 52. At a point 56 on the periphery of the planet gear 53 a pin is provided on which is pivoted an output bar 57, which is restricted by a slide bearing 58 to longitudinal motion. The extent of this motion is arranged to be exactly one-half that of the pin 39 in disc 33 by making the pitch diameter of the internal gear 52 one-half that of the internal gear 34. The relations of Equation 6 then apply in this case equally with the case employing Scotch yokes; that is, the linear displacement of the output bar 57 is for any angular displacement $\phi$ of the disc 33 proportional to one-half of the cosine of $2\phi$, and the corresponding displacement of the bar 41 is proportional to $\cos \phi$.

The output bar 57 is provided with a rack 59 and an associated pinion 61. To this pinion 61 there is fixed a dial 62 bearing a scale and having an associated fixed pointer 63. Obviously, to represent a cosine function this scale should have a center zero and extremes of $+\frac{1}{2}$ and $-\frac{1}{2}$, but in order to carry out the purposes of this invention the scale is displaced endwise so that zero is at one end, corresponding to the lowest position of the pin 56, and the other end of the scale represents $+1$. This is tantamount to adding $\frac{1}{2}$ to Equation 6, unity distance being taken as the pitch radius of the internal gear teeth 34 of the disc 33, so that the resulting relation is represented by Equation 7. This leads to an equality with $\cos^2 \phi$ as shown in Equation 8 so that magnitudes of linear displacement of the bar 41 and corresponding angular displacements of the pinion 44 and dial 47 cause magnitudes that are the square thereof respectively in the linear movement of the output bar 57 and in the rotational movements of the pinion 61 and dial 62. This is represented by Equation 10:

$$y = x^2 \qquad (10)$$

in which $y$ is the indication on scale 62 and $x$ is the indication on scale 47.

It is obvious that the pinions 44 and 61 can be made large so that the scales upon the associated dials 47 and 62 are 360° or less in length. On the other hand, either or both of the pinions can be made smaller, so that the scales upon either or both of the dials 47 and 62 have lengths greater than 360°, with any well-known methods employed for indicating quantities upon multi-turn scales. Thus greatly expanded scales can be employed to enhance the accuracy of utilization of the invention.

It is obvious that for quantities within the scope of the scale 62 this device is reversible, so that inputs applied to the pinion 61 cause outputs at the pinion 44 and indicated upon the dial 47 that are square roots of the inputs. It is true in this embodiment as well as in others that in securing square roots an ambiguity exists, there being two equal values of opposite sign of each root. This ambiguity is inherent in the mathematical basis of any such device and must be resolved by external means.

What is claimed is:

1. A device for solving the equation $$y = x^{2^n}$$

where $n$ is plus or minus unity comprising, means for introducing an input quantity in terms of a displacement magnitude, means for securing the arc cosine function of said displacement magnitude, means for multiplying said arc cosine function by $2^n$ to yield a product, and means for obtaining the cosine of said product as a displacement.

2. A device for obtaining the square of an input quantity comprising, means mechanically displaced in proportion to said input quantity, means producing a second mechanical displacement proportional to the arc cosine of said first mentioned displacement, multiplying means producing a third displacement which is twice that of said second displacement, means for obtaining the cosine of said third displacement, an indicator operated by said last mentioned means and a scale cooperating with said indicator.

3. A device for solving the equation $y = \sqrt{x}$ comprising, means mechanically displaced by an input quantity $x$, means for producing a second displacement equal to the arc cosine of said input quantity, means for producing a third displacement equal to one-half of said second displacement, means for producing a fourth displacement equal to the cosine of said third displacement, an indicator actuated by said last mentioned means, and a linear scale adjacent thereto for indicating the magnitude of said fourth displacement representing $y$.

4. A device for determining squares and square roots comprising, means for converting an input quantity to a rectilinear displacement proportional thereto, means including a first disc for converting said rectilinear displacement to an angular displacement equal to the arc cosine of said rectilinear displacement, a second disc, driving means interconnecting said first and second discs and driving said second disc in a two to one ratio in accordance with the rotation of said first disc, means including said second disc for producing a rectilinear displacement which is a cosine function of the annular displacement of said second disc, and output means operated by said last mentioned means.

5. A device for solving the equation $y = x^2$ in which either variable may constitute the output determined in accordance with an input which consists of the remaining variable comprising, a first member constrained for longitudinal movement, a first rotatable element operatively associated therewith and rotated by an amount which is an arc cosine function of the longitudinal movement of said first member, a second rotatable element operatively associated with said first rotatable member and rotated by an angular amount which is twice that of said first rotatable element, a second member constrained for longitudinal movement operatively associated with said second rotatable element and longitudinally displaceable by an amount which is a cosine function of the angular rotation of said second rotatable element, means for applying a selected input to one of said longitudinally movable members and means for deriving an output from the other of said longitudinally movable members.

6. A squaring device comprising, an input, a link member constrained for longitudinal movement operated by said input, a rotatable element connected to said link element and rotated thereby through an angle which is an arc cosine function of the movement of said link member, a second rotatable element operatively associated with said first mentioned rotatable element and rotated thereby through an angle which is twice that through which said first mentioned rotatable element is revolved, a second link member constrained for longitudinal movement connected to said second rotatable element and longitudinally moved thereby through a distance which is a cosine function of the angular movement of said second rotatable member and an output connected to said second link member.

7. A function computing device comprising, a first gear member having a pin mounted thereon extending parallel to the axis of said gear member at a unitary selected distance from said axis, a second gear member, means interconnecting said first and second gear members and for causing said second gear member to rotate through twice the angle of said first mentioned gear member, a pin mounted on said second gear member extending parallel to the axis thereof at a distance from said axis one-half that between the axis of said first mentioned gear member and the pin mounted thereon, a first Scotch yoke constrained for longitudinal movement having a crosshead engaging the pin mounted on said first gear member, a second Scotch yoke constrained for longitudinal movement having a crosshead engaging the pin mounted on said second gear member, said pins having zero relative phase displacement at one limit of the longitudinal movement of said first and second Scotch yokes, an output connected to one of said Scotch yokes and an input connected to the other of said Scotch yokes.

8. A function computing device comprising, a first bar, a slide bearing for restricting the bar to longitudinal motion, a first rotatable member having internal gear teeth, a first planetary gear meshed with said internal gear teeth and journalled in said first member at a radius equalling one-half of the pitch radius of the internal gear teeth, a bearing fixed in said first planetary gear at a radius equalling the pitch radius thereof, a journal in said first bar operatively associated with said bearing, a second member having internal gear teeth, means for drivingly connecting said first and second members in 1:2 ratio, a second planetary gear meshed with the internal teeth of said second disc and journalled thereon at a radius equalling one-half of the pitch radius of the internal teeth thereof and also one-half of the radius of said first planetary gear, a second bearing fixed in said second planetary gear at a radius equalling the pitch radius thereof, a second bar having a journal operatively associated with said second bearing, a second slide bearing for restricting said second bar to longitudinal motion, said first and second bearings having zero relative phase displacement at one limit of longitudinal movement of said first and second bars, an input connected to one of said bars and an output connected to the other of said bars.

IVAN A. GREENWOOD, Jr.

REFERENCES CITED

The following references are of record in the file of this patent:

UNITED STATES PATENTS

| Number | Name | Date |
|---|---|---|
| 2,173,436 | Handwerk | Sept. 19, 1939 |
| 2,229,156 | Wertheimer | Jan. 21, 1941 |
| 2,450,283 | Jones | Sept. 28, 1948 |
| 2,485,200 | Imm | Oct. 18, 1949 |
| 2,544,863 | Svoboda | Mar. 13, 1951 |

FOREIGN PATENTS

| Number | Country | Date |
|---|---|---|
| 335,512 | Italy | Feb. 6, 1936 |